(12) United States Patent
Freeman

(10) Patent No.: US 9,756,231 B2
(45) Date of Patent: Sep. 5, 2017

(54) WASTEWATER MONITORING SYSTEM AND METHOD

(71) Applicant: I&Eye Enterprises, LLC, Westwood, KS (US)

(72) Inventor: Brandon Casey Freeman, Springfield, MO (US)

(73) Assignee: I&Eye Enterprises, LLC, Westwood, KS (US)

( * ) Notice: Subject to any disclaimer, the term of this patent is extended or adjusted under 35 U.S.C. 154(b) by 124 days.

(21) Appl. No.: 14/634,104

(22) Filed: Feb. 27, 2015

(65) Prior Publication Data

US 2016/0255254 A1    Sep. 1, 2016

(51) Int. Cl.
| | | |
|---|---|---|
| *H04N 5/225* | (2006.01) | |
| *G03B 31/00* | (2006.01) | |
| *G03B 37/00* | (2006.01) | |
| *G03B 17/08* | (2006.01) | |

(52) U.S. Cl.
CPC ........... *H04N 5/2254* (2013.01); *G03B 31/00* (2013.01); *G03B 37/005* (2013.01); *H04N 5/2252* (2013.01); *G03B 17/08* (2013.01); *G03B 2215/0567* (2013.01); *H04N 2005/2255* (2013.01)

(58) Field of Classification Search
CPC .................................................. H04N 5/2254
See application file for complete search history.

(56) References Cited

U.S. PATENT DOCUMENTS

| | | |
|---|---|---|
| 4,567,514 A | 1/1986 | Morgan et al. |
| 4,974,168 A | 11/1990 | Marx |
| 7,002,620 B1 | 2/2006 | Rutledge |
| 7,715,701 B2 | 5/2010 | Lange |
| 8,054,459 B2 | 11/2011 | Lindner |
| 8,087,311 B2 | 1/2012 | Merlo |
| 8,381,593 B2 | 2/2013 | De Lorenzo et al. |
| 2006/0290779 A1 | 12/2006 | Reverte et al. |
| 2008/0210024 A1* | 9/2008 | Merlo .................. G01M 3/047 73/865.8 |
| 2009/0105969 A1 | 4/2009 | Saylor |

OTHER PUBLICATIONS

Browning; "Spec Ops Series" (webpage screenshot); Jun. 11, 2013; http://web.archive.org/web/20130611160456/http://browningtrailcameras.com/our-products/trail-cameras/spec-ops-series/.*

(Continued)

*Primary Examiner* — Gary C Vieaux
(74) *Attorney, Agent, or Firm* — Martin & Associates, LLC; Derek P. Martin

(57) ABSTRACT

A wastewater monitoring system uses a camera in a fixed location in a wastewater pipe that takes a still photograph of a location of interest at defined intervals, such as five minutes. The photographs are retrieved from the camera, and are then analyzed on a computer system that aggregates the still photographs into a video stream, allows a user to define an area of interest on one of the still photographs, then uses suitable algorithms or heuristics to detect changes between the photographs in the video stream. Video clips of interest are then generated using the detected changes, and are identified to a user so the user can review the video clips of interest to determine flows in the wastewater pipe that was monitored.

10 Claims, 12 Drawing Sheets

(56) References Cited

OTHER PUBLICATIONS

Browning; "Timelapse View Plus" (webpage screenshot); Jun. 22, 2013; http://web.archive.org/web/20140515022034/http://browningtrailcameras.com/our-products/trail-cameras/timelapse-viewer-plus/.*

Browning; "Product Instructions" (webpage screenshot); Jan. 10, 2014; http://web.archive.org/web/20140110094943/http://browningtrailcameras.com/customer-service/product-instructions/.*

Browning; "Instruction Manual"; PDF Linked from Jan. 10, 2014 web.archieve.org http://browningtrailcameras.com/wp-content/uploads/2012/10/Spec-Ops-user-manual-med-res.pdf.*

Montgomery, M.; "Time Lapse Video"; Feb. 1, 2010; https://www.videomaker.com/article/c3/14612-time-lapse-video; pp. 1-9.*

Microsoft; "how do I use a circle to identify a player in a sports video made with movie maker"; Sep. 7, 2012; http://answers.microsoft.com/en-us/windowslive/forum/moviemaker-av/how-do-i-use-a-circle-to-identify-a-player-in-a/54491480-9721-4825-a0a1-9d159703370b; pp. 1-7.*

Stackoverflow.com; "how can I quantify difference between two images?"; Oct. 10, 2008; http://stackoverflow.com/questions/189943/how-can-i-quantify-difference-between-two-images?answertab=votes#tab-top.*

BriefCam, Rapid Video Review: Benefits and Payoff, printed from http://briefcam.com/lorem-ipsum-dolor-sit-amet-consectetur-adipiscing-elit/ on Jan. 14, 2017.

* cited by examiner

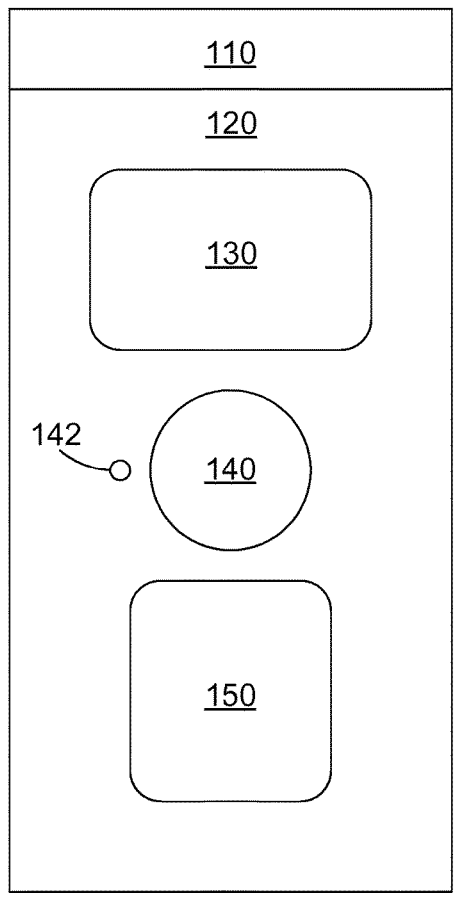
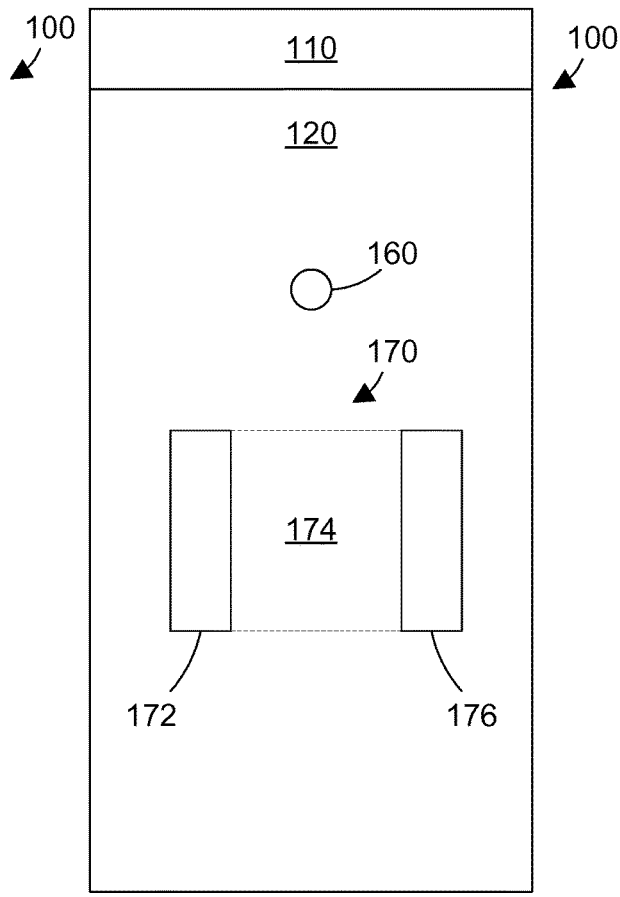
FIG. 1
FIG. 2
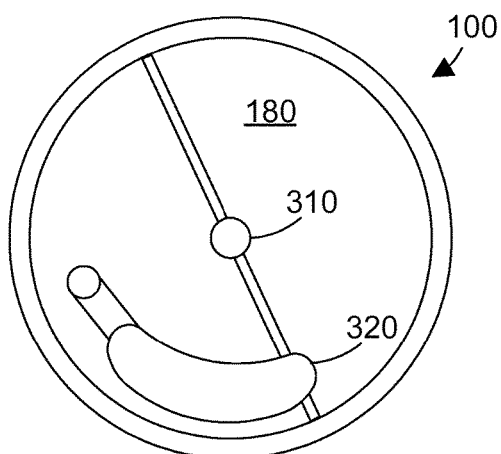
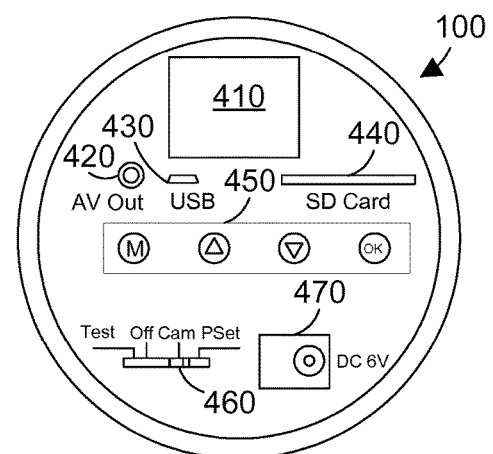
FIG. 3
FIG. 4

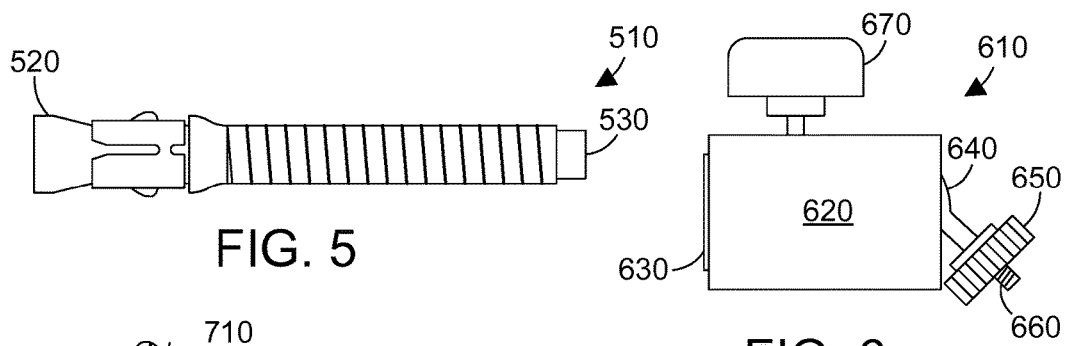
FIG. 5
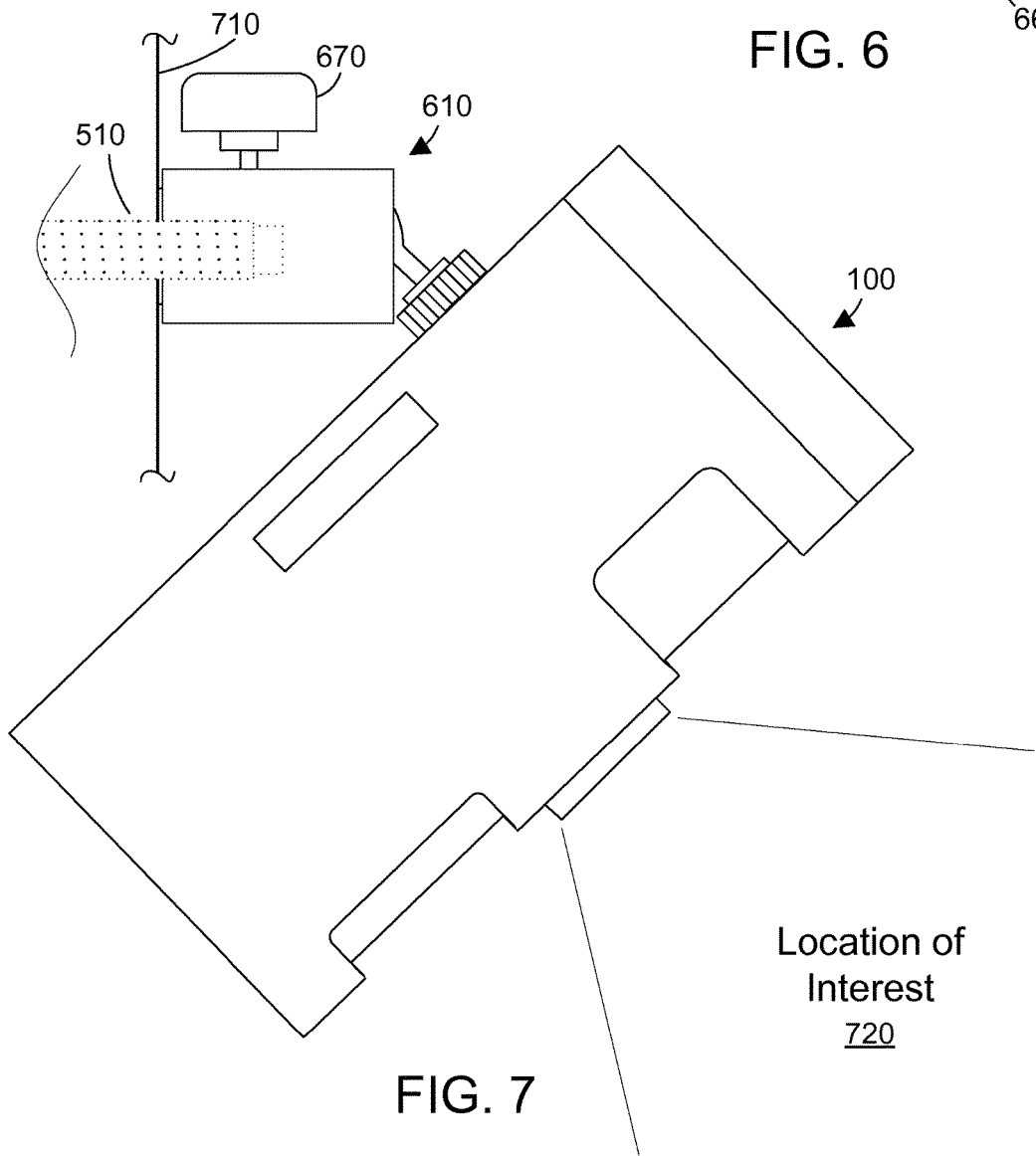
FIG. 6
FIG. 7

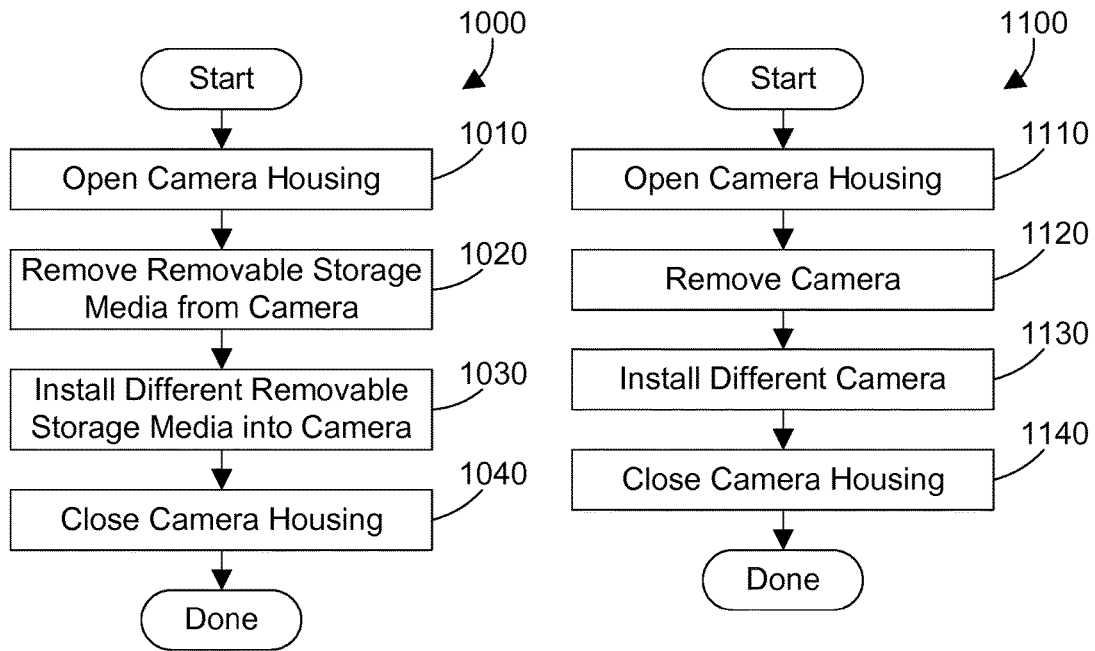
FIG. 10
FIG. 11
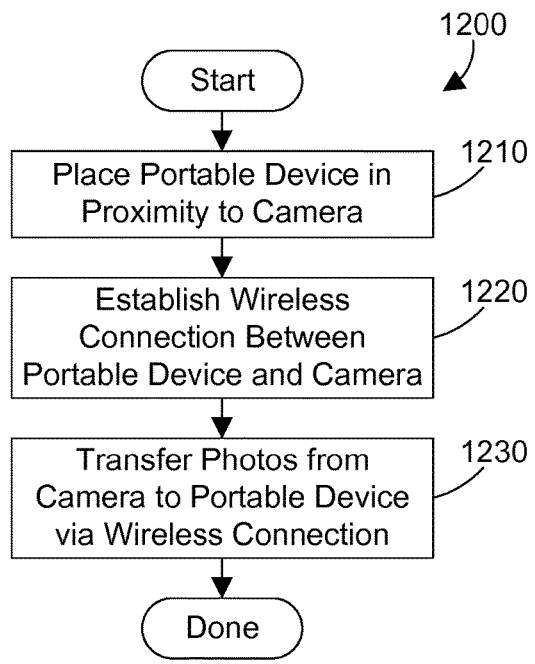
FIG. 12

WASTEWATER MONITORING SYSTEM AND METHOD

BACKGROUND

1. Technical Field

This disclosure generally relates to wastewater monitoring, and more specifically relates to monitoring levels of wastewater in a pipe.

2. Background Art

Many different systems have been developed over the years for monitoring or inspecting the interior of a pipe. For example, U.S. Pat. No. 8,087,311 issued on Jan. 3, 2012 to Stephen A. Merlot discloses a system that includes multiple cameras attached to an interior surface of a pipe that are connected to a data communication network so the data from the camera may be transmitted over the data communication network. A computing device in a remote location receives the data transmitted over the data communication network by the cameras.

The system disclosed in the Merlo patent referenced above requires communication between the imaging devices to a network and then to a computing device. Wireless communication in a sewer system may be difficult, because concrete and steel are often effective shields to wireless communication. Cabled communication is not a good option due to the hostile environment conditions in a wastewater pipe, and due to the expense of installing and maintaining such cables. As a result, the Merlo system is not an ideal solution in many applications. What is needed is a system and method for monitoring levels in a wastewater pipe that is inexpensive and does not require sophisticated cabling or wireless communication.

BRIEF SUMMARY

A wastewater monitoring system uses a camera in a fixed location in a wastewater pipe that takes a still photograph of a location of interest at defined intervals, such as five minutes. The photographs are retrieved from the camera, and are then analyzed on a computer system that aggregates the still photographs into a video stream, allows a user to define an area of interest on one of the still photographs, then uses suitable algorithms or heuristics to detect changes between the photographs in the video stream. Video clips of interest are then generated using the detected changes, and are identified to a user so the user can review the video clips of interest to determine flows in the wastewater pipe that was monitored.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 1 is front view of a camera that could be used in the wastewater monitoring system disclosed and claimed herein;

FIG. 2 is a rear view of the camera shown in FIG. 1;

FIG. 3 is a bottom view of the camera shown in FIGS. 1 and 2 with the bottom cover in place;

FIG. 4 is a bottom view of the camera shown in FIGS. 1 and 2 with the bottom cover removed;

FIG. 5 is a side view of a concrete anchor;

FIG. 6 is a side view of a ball joint;

FIG. 7 is a side view showing how the camera in FIGS. 1-4 can be mounted in a fixed location in a wastewater pipe using the concrete anchor in FIG. 5 and the ball joint in FIG. 6;

FIG. 10 is a flow diagram of a method for retrieving photographs from a camera that uses removable storage media;

FIG. 11 is a flow diagram of a method for retrieving photographs from a camera by swapping with a different camera;

FIG. 12 is a flow diagram of a method for retrieving photographs from a camera using a portable device that reads the photographs via a wireless connection;

DETAILED DESCRIPTION

Figures 8, 9:
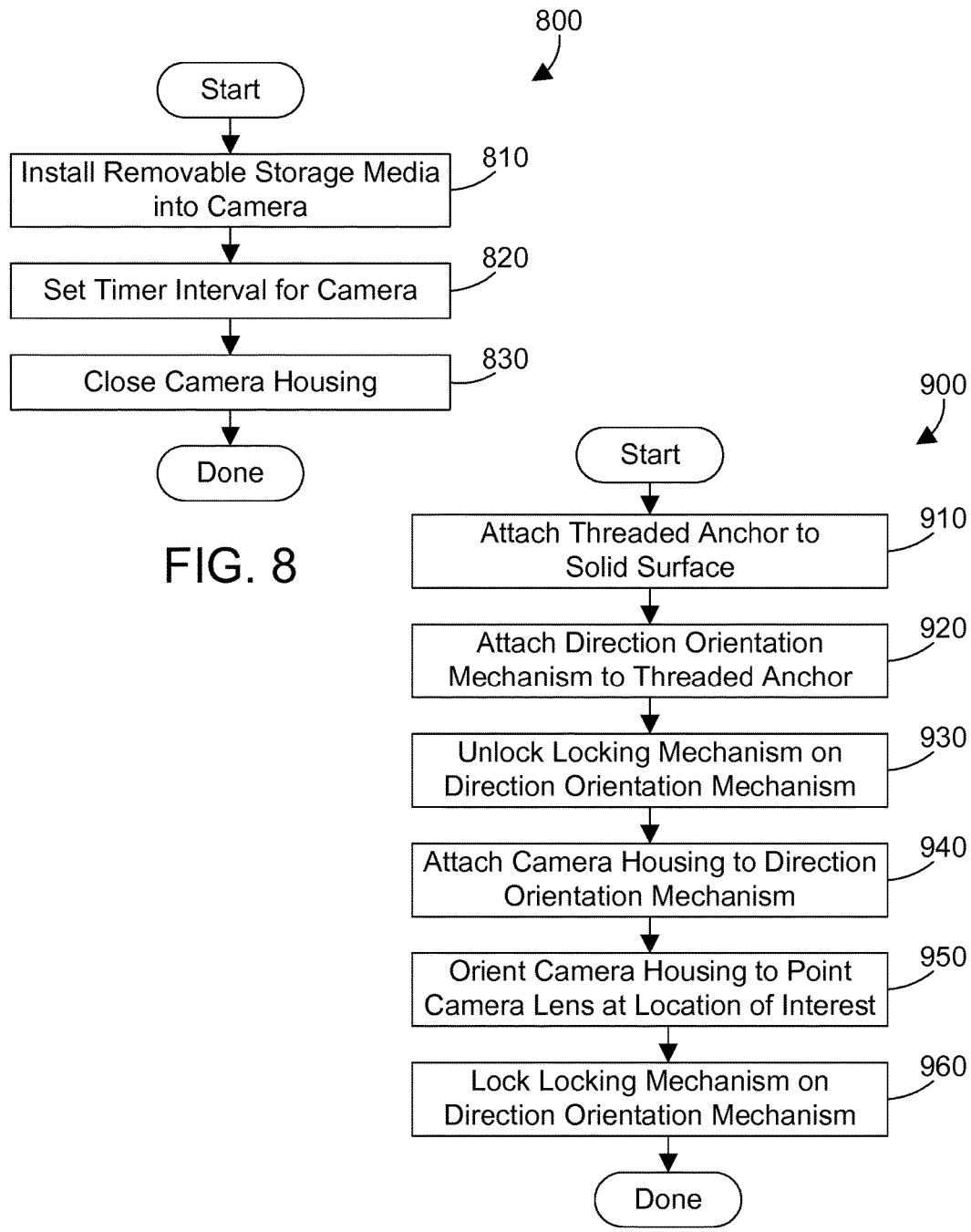
FIG. 8 is a flow diagram of a method for preparing a camera to monitor levels of wastewater in a wastewater pipe.
FIG. 9 is flow diagram of a method for installing a camera to monitor levels of wastewater in a wastewater pipe.

Most municipalities have separate systems for storm drains and for sewer. Sewage from homes and businesses typically runs in sewage pipes to a sewage treatment plant, which treats the sewage and outputs clean water. Storm water systems typically receive runoff from rain storms and direct the storm water to a holding basin, to a neighboring river or creek, etc. Because storm water is typically runoff from a storm, it typically does not contain sewage or other impurities that require significant treatment. As a result, storm water can often be returned to natural water sources such as creeks or rivers without treatment.

While sewer systems and storm water systems are designed to be separate, sometimes leaks can develop between the two. If storm water leaks into a sewage pipe, the result may be volumes of flow that exceed the design parameters of the sewage pipe. This can cause sewage systems to back up, and can also cause excessive flows to the sewage treatment plant.

Detecting when storm water leaks into a sewage pipe is not a simple or straight-forward process. The degree of the leak can obviously depend on the amount of runoff generated by a storm. Because storms that generate significant runoff are not daily events, a monitoring system must be able to monitor a location of interest for long periods of times, typically spanning several days or weeks. Many of the known systems for monitoring water levels in pipes are sophisticated and expensive. Small municipalities that have issues with storm water leaking into sewage pipes typically do not have the funds to invest in known sophisticated and expensive monitoring systems. For example, U.S. Pat. No. 8,087,311 issued on Jan. 3, 2012 to Stephen A. Merlot (discussed above in the Background Art section) discloses a system that includes multiple cameras attached to an interior surface of a pipe that are connected to a data communication network so the data from the camera may be transmitted over the data communication network. A computing device in a remote location receives the data transmitted over the data communication network by the cameras. Needless to say, installing multiple cameras in a pipe and installing a communication network is an expensive process. What is needed is a simple and inexpensive way to monitor water level in a pipe over days or weeks. The disclosure and claims herein provide a system and method that can detect water level in a pipe without the complexity and expense of known systems.

A wastewater monitoring system uses a camera in a fixed location in a wastewater pipe that takes a still photograph of a location of interest at defined intervals, such as five minutes. The photographs are retrieved from the camera, and are then analyzed on a computer system that aggregates the still photographs into a video stream, allows a user to define an area of interest on one of the still photographs, then uses suitable algorithms or heuristics to detect changes between the photographs in the video stream. Video clips of interest are then generated using the detected changes, and are identified to a user so the user can review the video clips of interest to determine flows in the wastewater pipe that was monitored. This allows detecting leaks in underground wastewater systems commonly known as infiltration and inflow.

As used herein, the term "wastewater monitoring system" refers to a system that can detect a level of water or other liquid-based material in a gravity-fed pipe. The term "wastewater" in this context means any suitable pipe, including without limitation sewer pipes and storm water pipes. Of course, the monitoring system could be used to monitor level of any material in any gravity-fed pipe, whether water-based or not. The disclosure and claims herein expressly extend to monitoring level of a material in any gravity-fed pipe, whether currently known or developed in the future.

In accordance with the system and method disclosed herein, a single camera can be mounted in a fixed location in or near a wastewater pipe that takes a still photograph of a location of interest at defined intervals. One suitable camera that can be used in the system and method disclosed herein is a digital battery-operated 8 megapixel camera that is marketed by Shenzhen Siyuan Digital Technology Co., Ltd. as a home security camera. Specifications for this camera are available at the web page http://siyuanchina.e-n.alibaba.com/product/217648263-200501337/8mp_HD_Weatherproof_IP66_Invisible_IR_home_security_guard_camera.html?edm_src=sys&edm_type=fdbk&edmgrp=0&edm_cta=read msg&edm_time=realtime&edm_ver=e. This camera is represented as camera 100 in FIGS. 1-4 and 7. FIG. 1 shows a front view of camera 100, which includes a top 110 that covers a battery compartment, a cylindrical body 120, an array of infrared illuminators 130, a lens 140, a laser 142, and a motion sensor 150. Note the motion sensor 150 is typically not used in the wastewater monitoring system disclosed herein. The laser 142 is used to provide a visual indication of where the camera is pointed. The back view of camera 100 shown in FIG. 2 shows a threaded insert 160 that is sized to receive the mounting post on most tripods, and a belt slot defined by two openings 172 and 176 that are interconnected with a passage 174, allowing a strap to be passed through the slot to attach the camera to something using a strap.

FIG. 3 shows a bottom view of the camera with the bottom cover 180 in place. The bottom cover 180 includes another threaded insert 310 that is sized to receive the mounting post on most tripods. The bottom cover 180 also includes a rubber cover 320 that provides a sealed cover that can be removed to access the switch 460 and the DC power jack 470 shown in FIG. 4 without removing the bottom cover 180.

FIG. 4 shows the bottom view of the camera 100 with the bottom cover 180 in FIG. 3 removed. The camera includes a small display 410, an Audio/Video Out jack 420, a micro USB jack 430, an SD card slot 440, a set of push buttons 450, a switch 460, and a DC power jack 470. The switch 460 and buttons 450 allow programming the camera for a desired mode of operation. Thus, using the display 410, buttons 450 and switch 460, the user could configure the camera to take a still photograph once every five minutes, for example. Once the camera is programmed for the desired function, the bottom cover 180 shown in FIG. 3 can be replaced, and the camera 100 is then ready to be deployed to monitor a location of interest.

Most wastewater systems have manholes that are typically made of brick or concrete and pipes that are typically made of concrete, polyvinyl chloride (PVC), clay, and other materials. Manholes are typically covered with manhole covers to provide access to the pipes to people who need to service the system. In the most preferred implementation, the camera 100 in FIGS. 1-4 is deployed to a location near a manhole, and is attached to a side of the concrete manhole or pipe using a concrete anchor 510 shown in FIG. 5. Concrete anchors 510 as shown in FIG. 5 are well-known and are available from a number of different suppliers. FIG. 6 shows a ball joint 610 that can be used to point the camera to a location of interest. The ball joint 610 includes an adjustment knob 670 that, when loose, allows the shaft comprising 640, 650 and 660 to pivot in relation to the position of the body 620. Once the adjustment knob 670 is tightened, the shaft comprising 640, 650 and 660 is locked into position. Ball joint 610 also includes a metal internally threaded insert 630. Ball joint 610 is one suitable example of a direction orientation mechanism that can be used to fixedly mount the camera to point to the location of interest.

Many other direction orientation mechanisms could be used within the scope of the disclosure and claims herein. One suitable example for ball joint 610 is the MH 1004 Mini Ball Head manufactured by Giottos.

Referring to FIG. 7, to mount the camera 100 in a fixed location so the camera can take photographs of a location of interest, a manhole cover is typically removed, a hole of the appropriate size is drilled in a concrete wall 710 with a cordless drill using a masonry bit, and the anchor end 520 of the concrete anchor 510 is then pounded into the hole, as partially shown at 510 in FIG. 5. The anchor is then secured in place, typically by turning a nut onto the threaded end 530 and turning the nut with a wrench until the anchor end 520 is securely anchored in the hole. Once the anchor 510 is securely anchored in the hole, as partially shown at 510 in FIG. 7, the threaded insert 630 of the ball joint 610 can be threaded onto the threaded end 530 of the anchor, as shown in FIG. 7. Once the ball joint 610 is secured in place to the anchor 510, the threaded insert 160 on the back of the camera 100 (shown in FIG. 2) is screwed onto the threaded post 660 of the ball joint 610, and the thumb wheel 650 can be turned to tighten the connection between the ball joint 610 and the camera 100. Once the camera is securely mounted to the threaded post 660, the knob 670 is loosened to allow the shaft of the ball joint to freely rotate, which allows the position of the camera 100 to be changed until the lends of the camera 100 is pointed to a location of interest 720. The process of pointing the camera 100 to the location of interest 720 is greatly simplified using laser 142 shown in FIG. 1. The laser 142 provides a colored dot of light that can be aimed at any suitable target in the location of interest to assure the camera is pointed at the location of interest. Once the camera 100 is pointed to the location of interest 720, the knob 670 is tightened to lock the camera in a fixed position with the lens pointed towards the location of interest 720. A nice feature of using the laser 142 is the ability to orient the camera in the same orientation time after time. A simple example will illustrate. Let's assume a person initially installs the camera as shown in FIG. 7, and uses the laser to point to a defined feature or point in the location of interest. The person could even mark the feature or point with a colored marker. The camera could be removed, then a year later the camera could be re-installed with the laser pointing to the same feature or point in the location of interest. The laser 142 thus provides precision in aiming the camera. Once the camera is re-installed and the laser 142 is pointed to the same point feature or point, the new photographs taken by the camera could then be compared with the photographs taken a year ago because the camera is pointing to the same feature or point in the location of interest.

While the installation shown in FIG. 7 shows installing the camera in a fixed location on a vertical surface near a manhole cover or pipe, the camera could be mounted on any suitable surface in any suitable orientation. For example, the camera could be mounted to the bottom surface of a manhole cover pointing straight down. In the alternative, the camera could be mounted to the bottom surface of a manhole cover pointing to an off-angle with respect to straight down. The manhole cover could then be rotated until the camera is pointed to the location of interest. One way to do this is to establish a wireless connection between the camera and a portable device such as a phone so what the camera is pointed to is visible on the portable device using an app on the portable device. These and other variations for mounting the camera are within the scope of the disclosure and claims herein.

Referring to FIG. 8, a method 800 includes the steps for preparing a camera for use in the wastewater monitoring system. First, removable storage media is installed into the camera (step 810). The timer interval for the camera is set (step 820). The camera housing is then closed (step 830). The camera is then ready to start taking photographs of the location of interest once the camera is mounted in the fixed location. For the specific example of the camera 100 in FIGS. 1-4, step 810 could include installing an SD card into the SD card slot 440 shown in FIG. 4. Step 820 would include the user setting the mode of the camera using the switch 460 and the buttons 450. Setting the camera to take a photograph every five minutes is one example of a suitable interval. The camera housing is closed in step 830 by installing the bottom cover 180 shown in FIG. 3.

The steps for installing a camera in a fixed location are shown in method 900 in FIG. 9. The threaded anchor is attached to a solid surface (step 910). The direction orientation mechanism is attached to the threaded anchor (step 920). The locking mechanism on the direction orientation mechanism is unlocked (step 930), which allows a second part of the direction orientation mechanism to change position with respect to a first part of the direction orientation mechanism that is attached to the anchor. The camera housing is then attached to the direction orientation mechanism (step 940). The camera housing is then oriented to point the camera lens at a location of interest (step 950). The locking mechanism on the direction orientation mechanism is then locked (step 960), which locks the camera in a fixed location that points the camera lens at the location of interest. Method 900 is then done. The result if performing methods 800 and 900 shown in FIGS. 8 and 9, respectively, is illustrated in a camera 100 as shown in FIG. 7 that is mounted in a fixed position with respect to the location of interest 720.

Once the camera has been in place and taking photographs for a sufficient period of time, which can include days or weeks, the photographs need to be analyzed. To avoid the expense of having the camera communicate with some hard-wired or wireless communication system, the photographs are preferably retrieved from the camera by a person going to the location where the camera is mounted and retrieving the photographs. This can be done in different ways. When the camera includes removable media, such as a SD card, a thumb drive, or other removable media, method 1000 in FIG. 10 may be used. The person retrieving the photos opens the camera housing (step 1010). The removable storage media upon which the photos have been stored is removed from the camera (step 1020). A different removable storage media can be optionally installed into the camera (step 1030). The camera housing is then closed (step 1040). The person who removed the removable storage media can then transport the removable storage media with all its stored photos to a different location for analysis.

Instead of using a camera that has removable storage media, a camera could be used that stores the photographs in its internal memory. In this case, the camera could be removed and replace with a similar camera so the camera's stored photographs can be analyzed. Referring to FIG. 11, method 1100 begins by the user opening the camera housing (step 1110). The user removes the camera from the housing (step 1120), installs a different camera into the housing (step 1130), and closes the camera housing (step 1140). The camera that has the stored images can then be transported to a different location for analysis while the new camera continues to take photographs of the location of interest.

In yet another implementation, the camera can include a wireless interface, such as a Bluetooth interface, that allows the person to download the photographs from the camera to a portable device, such as a laptop computer, tablet computer, or smart phone that is in proximity to the camera. Referring to FIG. 12, method 1200 begins by placing a portable device in proximity to the camera (step 1210). This may require, for example, removing the manhole cover and physically placing the portable device in proximity to the camera. The person can then establish a wireless connection between the portable device and the camera (step 1220), and can transfer the photographs from the camera to the portable device via the wireless connection (step 1230). At this point the photographs are now on the portable device, which can be transported to a different location for analysis. Of course, if the portable device has sufficient computing capacity and the proper software, the analysis of the photographs can be done directly by the portable device without transporting the portable device to a different location. In addition, in many circumstances the wireless interface may be available without removing the manhole cover. A simple example will illustrate. Let's assume the camera is installed in a manhole in the middle of a busy intersection. Assuming a portable device can access the wireless interface of the camera without removing the manhole cover, a person could stand on a street corner near the intersection and access the photographs in the camera using a portable device without the need of stopping traffic or removing the manhole cover.

Figure 13:
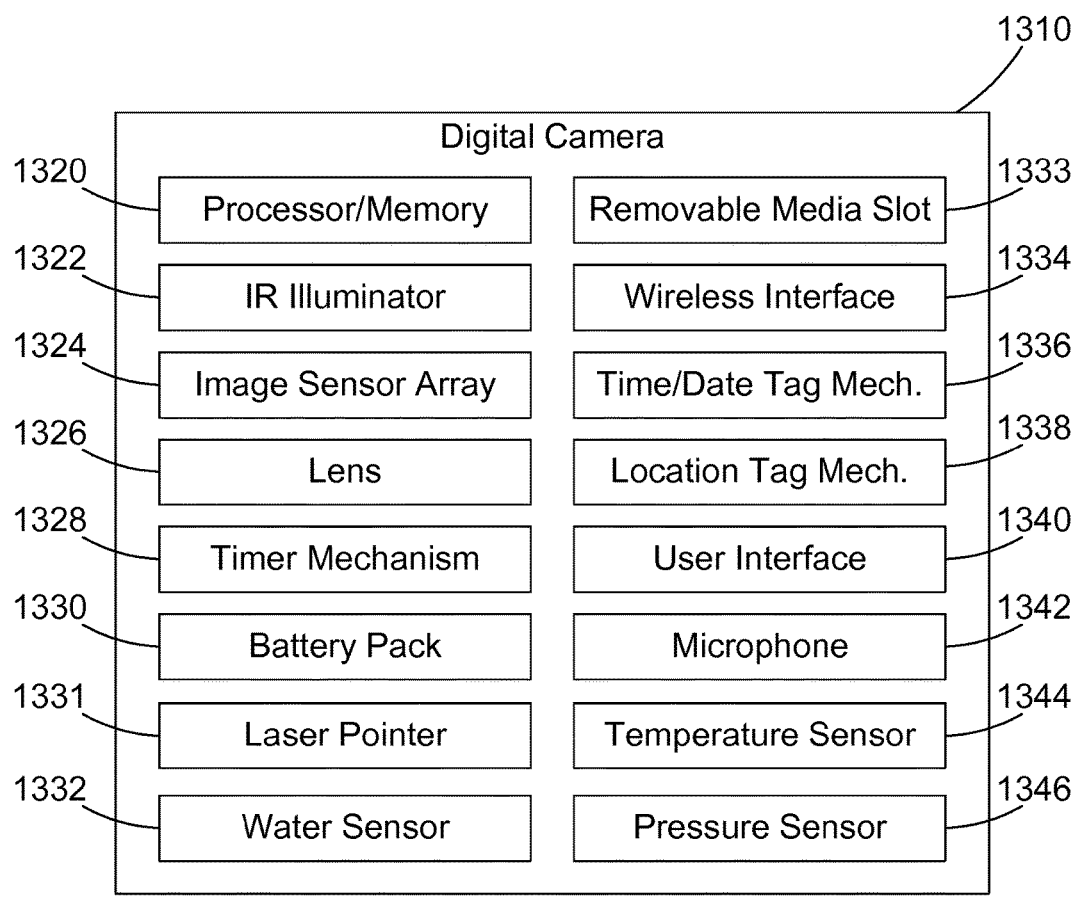
FIG. 13 is a block diagram of a digital camera that could be used in the wastewater monitoring system.

Referring to FIG. 13, a suitable digital camera 1310 could be used in the wastewater monitoring system disclosed and claimed herein. The digital camera 1310 includes a processor and internal memory 1320; an infrared illuminator 1322; an image sensor array 1324; a lens 1326; a timer mechanism 1328; a battery pack 1330; a laser pointer 1331; a water sensor 1332, a removable media slot 1333; a Bluetooth interface 1334; a time/date tag mechanism 1336; a location tag mechanism 1338; a user interface 1340; a microphone 1342; a temperature sensor 1344; and a pressure sensor 1346. The processor/memory 1320 provides the control and processing function for taking and storing digital photographs. The infrared illuminator 1322 is preferably one or more infrared light sources that can serve to illuminate a location of interest, such as an array of infrared light-emitting diodes (LEDs). The infrared illuminator 1322 is important in wastewater monitoring because wastewater pipes typically do not have sufficient light for a photograph without using an infrared illuminator. While infrared illuminators 1322 are shown in the figures and discussed herein, one skilled in the art will appreciate that other types of illuminators could also be used. The image sensor array 1324 is an array of photo-sensitive devices, such as charge-coupled devices (CCDs) that allow taking a digital photograph, as is known in the art. The lens 1326 could be a fixed-focus lens, or could be an adjustable lens, where the lens directs an image to be taken as a photograph onto the image sensor array 1324. The timer mechanism 1328 allows a user to set a time interval so the camera 1310 will take one photograph automatically each defined time period, such as five minutes. The battery pack 1330 can include any suitable direct current power source from any suitable battery chemistry or technology. The battery pack 1330 could be single-use, or could be rechargeable. The battery pack 1330 preferably provides sufficient power for the camera 1310 to function taking photographs for days or weeks without interruption.

The laser pointer 1331 provides a visual indication such as a colored dot from a low-power laser that helps to point the camera lens at the location of interest. As discussed above, the laser pointer 1331 provides precision in pointing the camera so the camera can be repeatedly removed and installed to point to the same feature or point in the location of interest. This allows correlating photographs taken across multiple installations. The water sensor 1332 detects when water contacts the camera or the housing of the camera. For a camera similar to the camera shown in FIGS. 1-4 and 7, the water sensor 1332 could include two metal contact points on the case, where the water sensor 1332 detects electrical resistance between the two metal contact points. When water does not bridge the gap between the two metal contact points, the water sensor 1332 detects a very high electrical resistance, which means no water is present. When water bridges the gap between the two metal contact points, the water sensor 1332 detects a significantly lower electrical resistance, which means water is present. In some implementations, such as with a housing such as shown in FIGS. 16-21, the water sensor would have metal probes on the exterior of the housing connected with wires to circuitry within the camera that would detect whether water is contacting the housing. The water sensor 1332 is especially useful in detecting an overflow condition where water is flooding up and out of the wastewater system through the manhole covers.

The removable media slot 1333 allows removable storage media to be installed into the camera 1310, which will result in photographs being stored on the removable storage media. The wireless interface 1334 can be used to connect the camera 1310 to a portable device for transferring the stored photographs to the portable device. A Bluetooth interface is one suitable example of a wireless interface 1334. A Wi-Fi interface is another suitable example of a wireless interface 1334. The loading of photographs from a camera to a portable device via a wireless interface is discussed above with reference to method 1200 in FIG. 12. Note, however, the wireless interface 1334 could also be used to configure the function of the camera 1310 so the user does not have to move switches or push buttons on the camera 1310 to put the camera 1310 in the desired mode of operation.

The time/date tag mechanism 1336 tags each photograph taken by the camera with the time and date of the photograph. The tagging of time and date for a photograph is most preferably done electronically by storing metadata that includes the time and date as part of the digital photograph file. In addition, the time and date could also be optionally superimposed on the photograph itself so the time and date is visually apparent to a person viewing the photograph. The location tag mechanism 1338 could optionally tag each photo with the geographic location of the camera when the photograph was taken. The geographic location can be specified in any suitable way, including global positioning system (GPS) coordinates, or using any other way for specifying a geographic location, whether currently known or developed in the future. The user interface 1340 allows the user to setup the camera 1310 to a desired mode of operation, such as taking a photograph automatically every five minutes. The user interface 1340 can optionally include a display that allows viewing the image captured by the camera. The microphone 1342 can be optionally used to change function of the camera 1310. For example, let's assume the camera 1310 is initially setup to take a photograph every five minutes. Let's further assume the camera monitors the ambient sound level using microphone 1342. When the ambient sound level detected by the microphone 1342 exceeds some specified threshold, which could indicate rushing water in the pipe, the camera function could change to take a photograph every minute instead of every five minutes. Because the camera 1310 is used to monitor level of water in a pipe, and because water makes sounds as it passes through a pipe, a change in the volume level detected by the microphone 1342 on the camera 1310 can indicate a change in the water level in the pipe, and could thus be used to change the function of the camera as desired or to tag one or more photographs according to detected sound levels.

The temperature sensor 1344 detects temperature at or near the location of interest. This is most easily done using a remote temperature sensor. One suitable remote temperature sensor is a laser-type temperature sensor that detects temperature of a surface contacted with a laser. Such laser-type temperature sensors are available in most hardware stores at nominal cost, and could be built into the camera as shown in FIG. 13. Because groundwater that leaks into a sewer system in infiltration or inflow is typically a different temperature than the material flowing in the sewer system, a rapid change in temperature can signal the presence of groundwater in the sewage pipe. In some applications or at some times of the year, the groundwater could be significantly warmer than the sewage in the sewer pipe. In other applications or at other times of the year, the groundwater could be significantly cooler than the sewer in the sewer pipe. When the camera detects via the temperature sensor 1344 a rise or drop in temperature that exceeds some defined threshold over some defined time period, the camera could change its function. For example, the camera could be initially programmed to take one photograph every five minutes. But when the camera detects via the temperature sensor 1344 a change in temperature that exceeds the defined threshold over the defined time period, the camera could automatically change to taking one photograph every minute instead of every five minutes. The disclosure and claims herein expressly extend to suitably changing the function of a camera based on some detected temperature change.

The pressure sensor 1346 could be used to detect when the pressure at the camera increases. This could happen, for example, when the system backs up and overflows through the manhole covers. The pressure sensor 1346 allows the camera to detect when the pressure surrounding the camera or housing increases, thereby allowing the camera to alter its function, send an alarm, etc.

Figure 14:
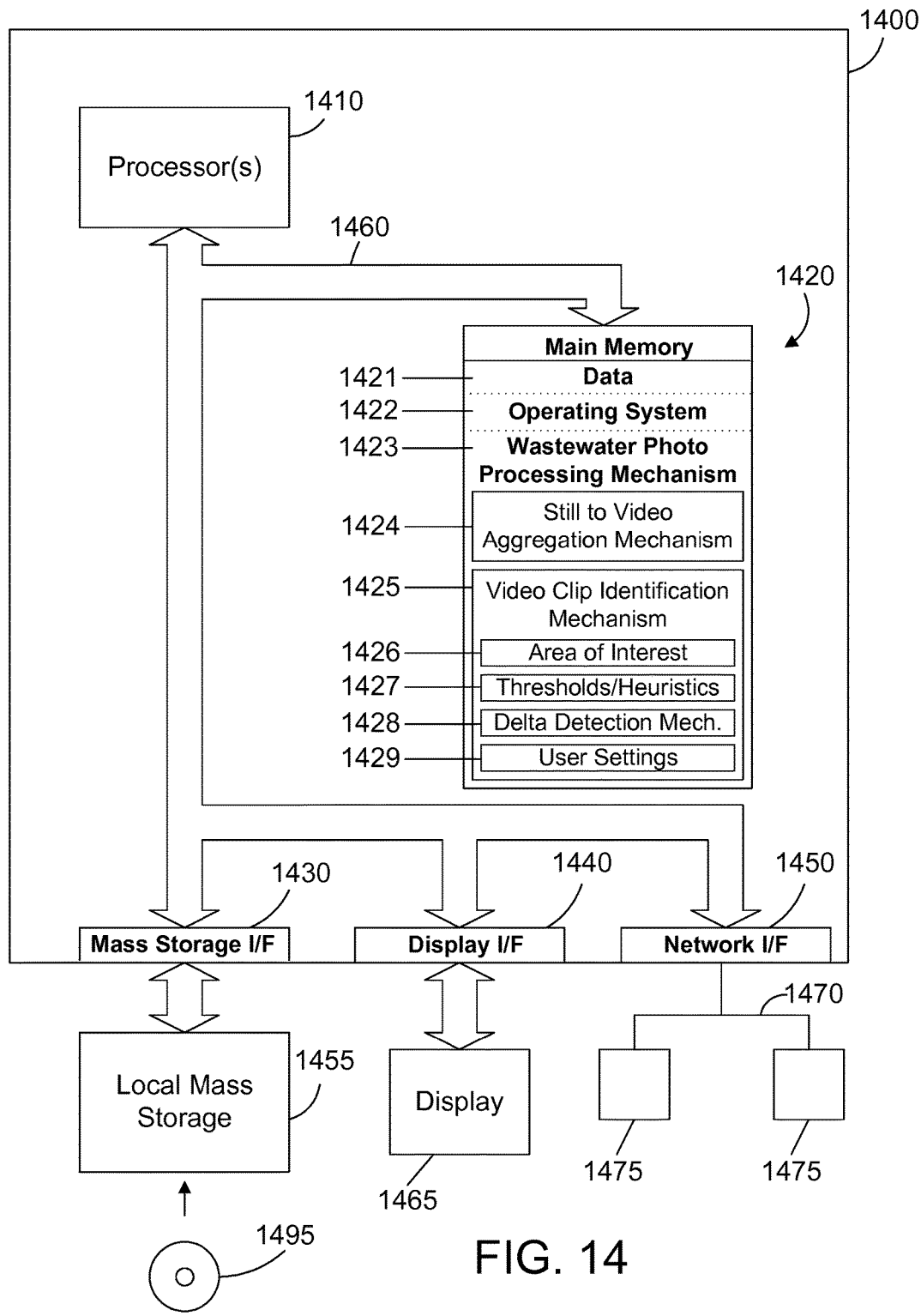
FIG. 14 is a block diagram of a computer apparatus that includes a wastewater photo processing mechanism that processes the photographs retrieved from a camera in a wastewater pipe.

In one specific implementation, a person retrieves the photographs from a camera installed in a wastewater pipe, and processes the photographs on a separate computer system, such as a desktop or laptop computer system back at the office. Referring to FIG. 14, computer system 1400 is representative of any suitable computer system that could analyze photographs, including without limitation a desktop computer, a laptop computer, a tablet computer, and a smart phone. Computer system 1400 could be, for example, a Window-based computer system. However, those skilled in the art will appreciate that the disclosure herein applies equally to any computer system, regardless of whether the computer system is a complicated multi-user computing apparatus, a single user workstation, or an embedded control system. As shown in FIG. 14, computer system 1400 comprises one or more processors 1410, a main memory 1420, a mass storage interface 1430, a display interface 1440, and a network interface 1450. These system components are interconnected through the use of a system bus 1460. Mass storage interface 1430 is used to connect mass storage devices, such as local mass storage device 1455, to computer system 1400. One specific type of local mass storage device 1455 is a readable and writable CD-RW drive, which may store data to and read data from a CD-RW 1495.

Main memory 1420 preferably contains data 1421, an operating system 1422, and a wastewater photo processing mechanism 1423. Data 1421 represents any data that serves as input to or output from any program in computer system 1400. Operating system 1422 is a multitasking operating system. Wastewater photo processing mechanism 1423 is computer software that processes photographs taken by an installed camera to help a user identify potential problems based on level of water in a pipe. The wastewater photo processing mechanism 1423 includes a still to video aggregation mechanism 1424, and a video clip identification mechanism 1425. The still to video aggregation mechanism 1424 simply puts all of the photographs retrieved from an installed camera into time order in a video stream. Note, however, the video stream could include many hours of data that would be very tiresome for a human user to view. Even though the camera only took one photo each time interval, such as five minutes, the resulting video stream after aggregating the photographs over days or weeks could be many hours long. So one of the helpful features of the wastewater photo processing mechanism 1423 is to help identify video clips that may be of interest to the user. The video clip identification mechanism 1425 allows a user to define an area of interest 1426 on one of the photographs. Once the area of interest is defined by the user, the video clip identification mechanism 1425 can use any suitable threshold or heuristic to compare photographs to determine which photographs have sufficient differences to merit viewing by a user. For example, the pixel values in a photograph could be compared to the pixel values in the preceding photograph in time. When a defined number of pixels in the area of interest are different than the corresponding pixels in the preceding photograph, the change can be detected by a delta detection mechanism 1428. The delta detection mechanism 1428 detects deltas, or changes, in a video stream based on a mathematical analysis that is performed using defined thresholds and/or heuristics 1427. The video clip identification mechanism 1425 also functions according to defined user settings 1429. The user settings provide a user with some adjustment capability for the wastewater photo processing mechanism. The user settings could include specifying a number of seconds or minutes to display before and after detected changes, how changes are detected, etc. Thus, in a first pass, the user could specify a relatively high threshold with a relatively short number of minutes before and after the changes to display. If the result is short video clips that do not provide enough information to the user, the user could then specify a lower threshold with a longer number of minutes before and after the changes to display. The user settings 1429 thus provide a way for the user to adjust the function of the wastewater photo processing mechanism 1423 according to the user's preferences.

Computer system 1400 utilizes well known virtual addressing mechanisms that allow the programs of computer system 1400 to behave as if they only have access to a large, contiguous address space instead of access to multiple, smaller storage entities such as main memory 1420 and local mass storage device 1455. Therefore, while data 1421, operating system 1422, and wastewater photo processing mechanism 123 are shown to reside in main memory 1420, those skilled in the art will recognize that these items are not necessarily all completely contained in main memory 1420 at the same time. It should also be noted that the term "memory" is used herein generically to refer to the entire virtual memory of computer system 1400, and may include the virtual memory of other computer systems coupled to computer system 1400.

Processor 1410 may be constructed from one or more microprocessors and/or integrated circuits. Processor 1410 executes program instructions stored in main memory 1420. Main memory 1420 stores programs and data that processor 1410 may access. When computer system 1400 starts up, processor 1410 initially executes the program instructions that make up operating system 1422. Processor 1410 also executes the wastewater photo processing mechanism compiler 1423.

Although computer system 1400 is shown to contain only a single processor and a single system bus, those skilled in the art will appreciate that a wastewater photo processing mechanism as described herein may be practiced using a computer system that has multiple processors and/or multiple buses. In addition, the interfaces that are used preferably each include separate, fully programmed microprocessors that are used to off-load compute-intensive processing from processor 1410. However, those skilled in the art will appreciate that these functions may be performed using I/O adapters as well.

Display interface 1440 is used to directly connect one or more displays 1465 to computer system 1400. These displays 1465, which may be non-intelligent (i.e., dumb) terminals or fully programmable workstations, are used to provide system administrators and users the ability to communicate with computer system 1400. Note, however, that while display interface 1440 is provided to support communication with one or more displays 1465, computer system 1400 does not necessarily require a display 1465, because all needed interaction with users and other processes may occur via network interface 1450.

Network interface 1450 is used to connect computer system 1400 to other computer systems or workstations 1475 via network 1470. Network interface 1450 broadly represents any suitable way to interconnect electronic devices, regardless of whether the network 1470 comprises present-day analog and/or digital techniques or via some networking mechanism of the future. Network interface 1450 preferably includes a combination of hardware and software that allows communicating on the network 1470. Software in the network interface 1450 preferably includes a communication manager that manages communication with other computer systems 1475 via network 1470 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 1450.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 15:
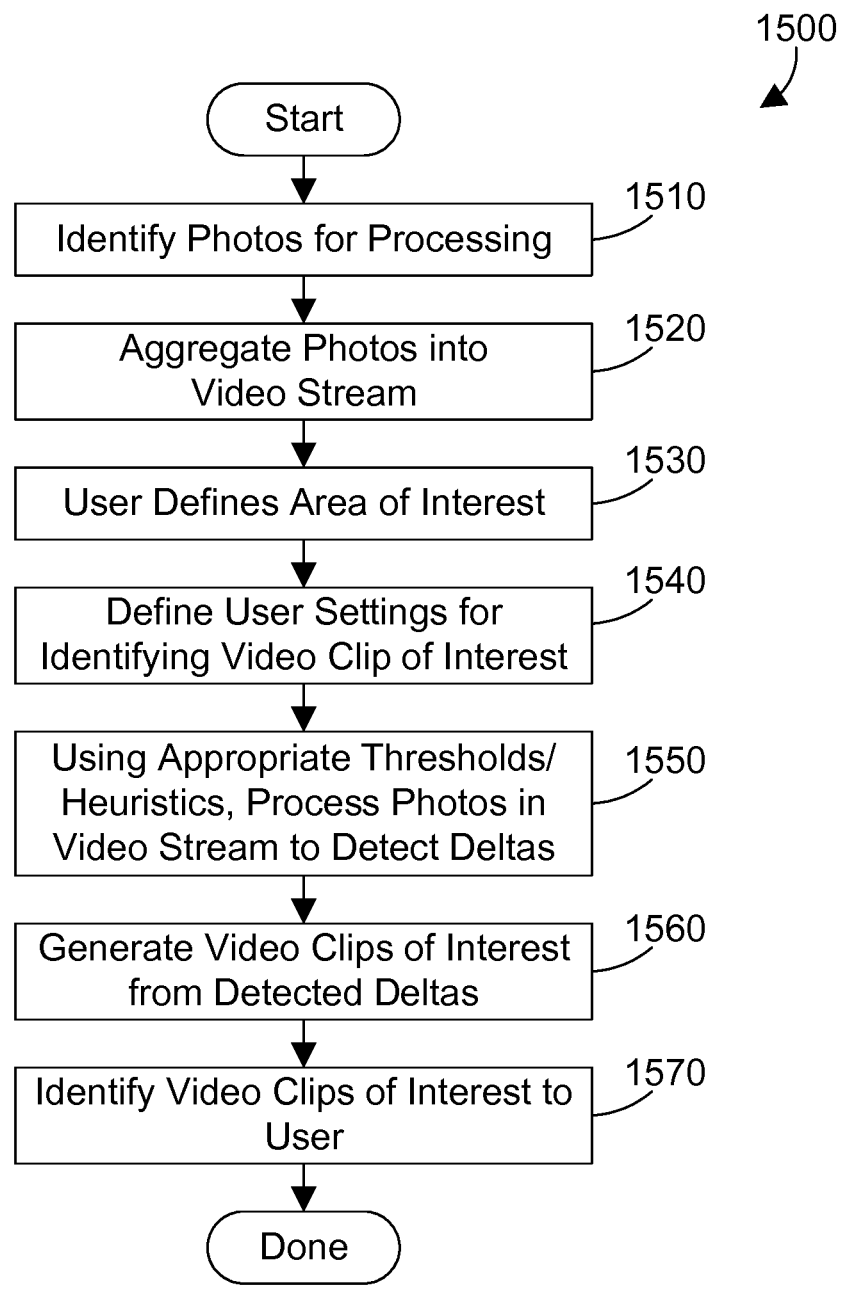
FIG. 15 is a flow diagram of a method for identifying video clips of interest to a user from a larger set of photographs using detected deltas (changes)

Referring to FIG. 15, a method 1500 represents steps that could be performed by the wastewater photo processing mechanism 1423 shown in FIG. 14. Photos are identified for processing (step 1510). One way to identify photos for processing is according to how the photos are stored. For example, photos stored on an external storage medium, such as an SD card, could all be identified as photos to be processed. Folders or directories could also identify photos for processing. Of course, the user could also use a software tool to identify photos for processing by selecting a group of photos for processing. The identified photos are aggregated into a video stream (step 1520). This could be done, for example, by the still to video aggregation mechanism 1424 in FIG. 14. The user then defines an area of interest (step 1530). The user can define an area of interest in any suitable way. For example, the user could allow the wastewater photo processing mechanism to determine a normal flow area in most of the photographs, and define an area of interest to be anything outside the normal flow area. In the alternative, the user could use a mouse or other pointing device to graphically designate an area of interest, as illustrated below with reference to FIGS. 26-28. The user may also define user settings for identifying the video clip of interest (step 1540). Using appropriate thresholds, heuristics or other algorithms, the photos in the video stream are processed to detect deltas (or changes) (step 1550). Deltas are defined by differences between adjacent photos, and can be determined using any suitable function, including pixel color, pixel brightness, a histogram function, or any other suitable function for processing photographs. Once deltas are detected, one or more video clips of interest are generated from the detected deltas (step 1560). The video clips of interest are then identified to the user (step 1570). The user can then view the video clips of interest to determine water levels in the pipe being monitors at times when the water level changed. Method 1500 provides a significant advance over the known art by automatically filtering through a large number of photographs that are not statistically significant in determining differences in water levels and efficiently identifying video clips of interest that are most likely to show water levels of interest according to the detected deltas and the user settings.

Detecting deltas in step 1550 and generating video clips of interest in step 1560 may be done in any suitable manner. For example, two photographs could be identified that have the single biggest delta, and a video clip could be generated that includes a specified number of minutes or photographs before and after the detected delta. Another suitable way to detect deltas is using some average over a number of photographs. Thus, pixel values could be averaged over a sliding window of 10 photographs, and when the next photograph processed has a delta that exceeds some threshold when compared to the average of the 10 previous photographs, the delta can be marked, and a video clip of interest can be generated by including the delta and including a specified number of minutes or photographs before and after the detected delta. This includes computing an average pixel value over a predefined number of photographs and determining when a plurality of pixels in a photograph exceeds the computed average pixel value by some defined threshold. Of course, many other algorithms could be used to detect deltas and to generate from the detected deltas video clips of interest. The disclosure and claims herein expressly extend to any suitable manner for detecting deltas in a group of identified photographs, and to any suitable manner for generating video clips of interest from the detected deltas.

Figure 16:
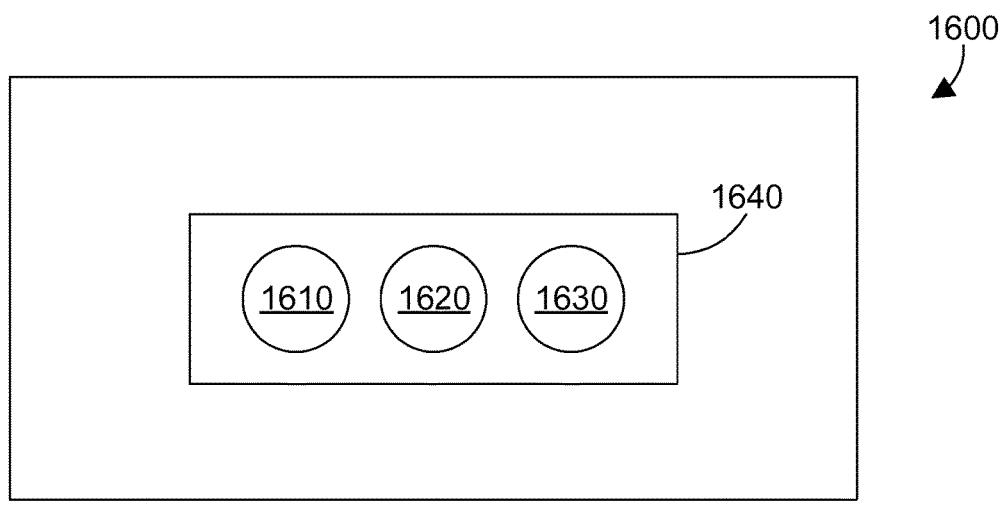
FIG. 16 is a front view of a camera housing that includes multiple lenses.
Figures 17, 18:
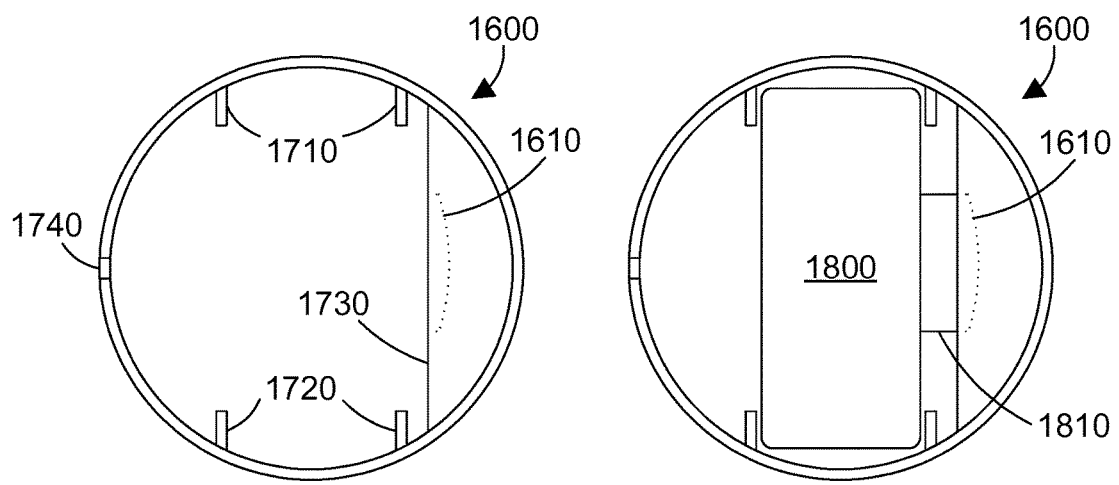
FIG. 17 is a side view of the camera housing shown in FIG. 16.
FIG. 18 is a side view of the camera housing shown in FIGS. 16 and 17 with a camera installed.

While the specific camera shown in FIGS. 1-4 and 7 and described above could be used, other cameras could also be used as well. Due to the harsh environment conditions in a wastewater pipe, a camera needs to be sealed in an air-tight and gas-tight housing. One suitable housing 1600 is shown in FIG. 16. Housing 1600 is preferably cylindrical in shape, and in the embodiment shown in FIG. 16 includes a recess 1640 that includes a plurality of lenses 1610, 1620 and 1630. In this embodiment with three lenses, the first lens 1610 could be a wide-angle lens, the second lens 1620 could be a standard lens, and the third lens 1630 could be a telephoto lens. The lenses 1610, 1620 and 1630 could be integrally formed with the same material as the housing, or could be separate pieces bonded to the housing. For example, if the housing is made of Lexan, the lenses could be molded into the housing. The housing 1600 preferably includes internal ribs 1710 and 1720 as shown in FIG. 17 that serve to align a camera properly within the housing. Ribs 1710 and 1720 are examples of suitable registration features that align a camera within the housing. A flat front surface 1730 is placed in a position such that when a camera 1800 is properly slid between the internal ribs 1710 and 1720 as shown in FIG. 18, the lens 1810 of the camera will align with one of the lenses, such as 1610 shown in FIG. 18. Note that housing 1600 preferably includes one or more threaded inserts 1740 for attaching the housing to a direction orientation mechanism, such as a ball joint.

Figure 19:
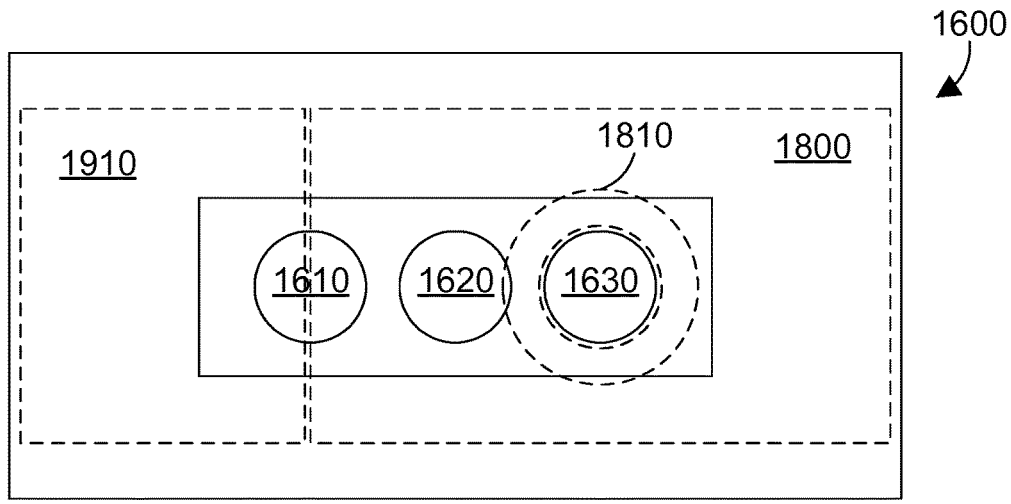
FIG. 19 is a front view of the camera housing with a camera installed to align with the third lens in the camera housing.
Figure 20:
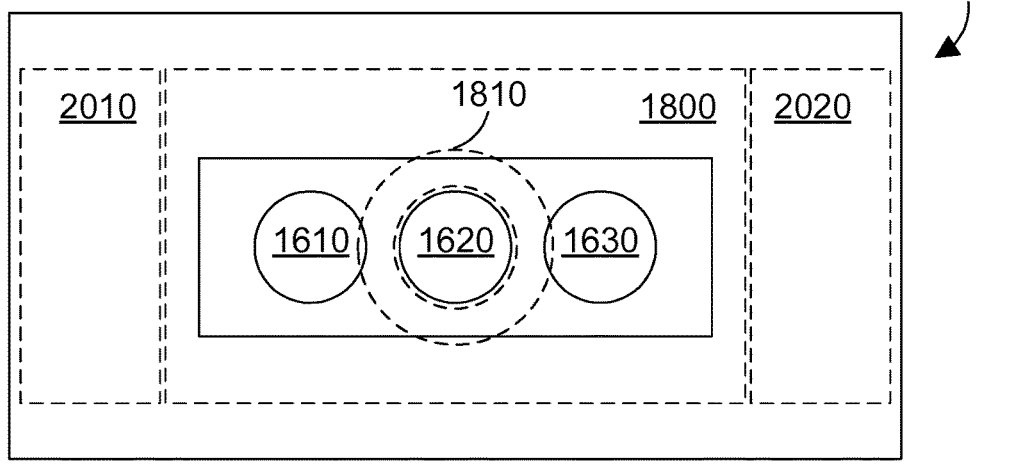
FIG. 20 is a front view of the camera housing with a camera installed to align with the second lens in the camera housing.
Figure 21:
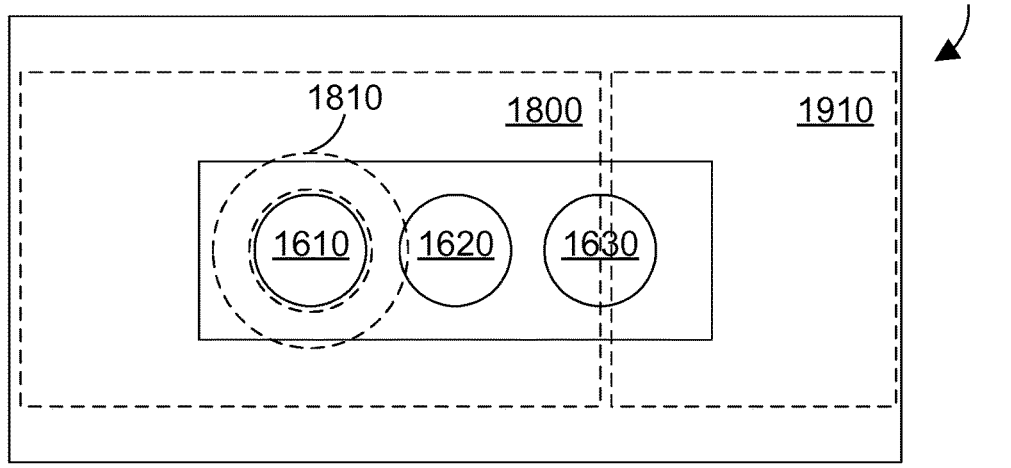
FIG. 21 is a front view of the camera housing with a camera installed to align with the first lens in the camera housing.

Which of the three lenses are used depends on spacer blocks. Referring to FIG. 19, the lens 1810 of the camera 1800 is aligned over the third lens 1630 when a spacer block 1910 is used as shown. Referring to FIG. 20, the lens 1810 of the camera 1800 is aligned over the second lens 1620 when two spacer blocks 2010 and 2020 are placed on each side of the camera 1800 as shown. Referring to FIG. 21, the lens 1810 of the camera 1800 is aligned over the first lens 1610 when the spacer block 1910 shown in FIG. 19 is placed on the opposite side of the camera, as shown in FIG. 21. These spacer blocks could be made of any suitable material. In addition, the spacer blocks could also include batteries so the spacer blocks also act as battery packs for the camera. A connection could be made from the camera to one or more battery pack spacer blocks using a suitable cable, or using electrical contacts on the camera that contact corresponding electrical contacts on the battery pack spacer block(s) such that when they are properly installed, the battery pack spacer block(s) provide power to the camera.

Figure 22:
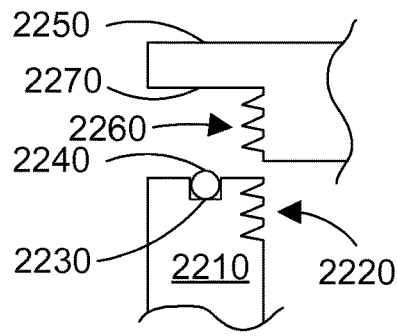
FIG. 22 is a view showing a removable lid for the camera housing that provides a water-tight and gas-tight seal.
Figure 23:
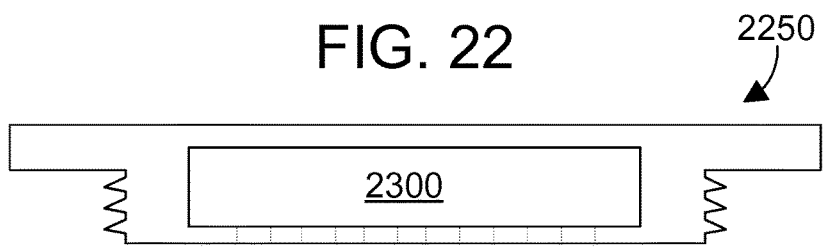
FIG. 23 is a side cross-sectional view of a removable lid for the camera housing that includes a desiccant compartment.

One or both ends of the housing 1600 shown in FIGS. 16-21 could include a water-tight and gas-tight cap. One suitable configuration for such a water-tight and gas-tight cap is shown in FIGS. 22 and 23. FIG. 22 shows a side wall 2210 of the cylindrical housing 1600, which includes an internally-threaded portion 2220 and a groove 2230 that contains a circular rubber O-ring 2240, shown in cross-section in FIG. 22. The cap 2250 includes an externally-threaded portion 2260 and a flat portion 2270 such that when the cap is screwed into the threads 2220, the flat portion 2270 contacts the O-ring 2240 to create a water-tight and gas-tight seal, thereby protecting the enclosed camera from moisture.

Figure 24:
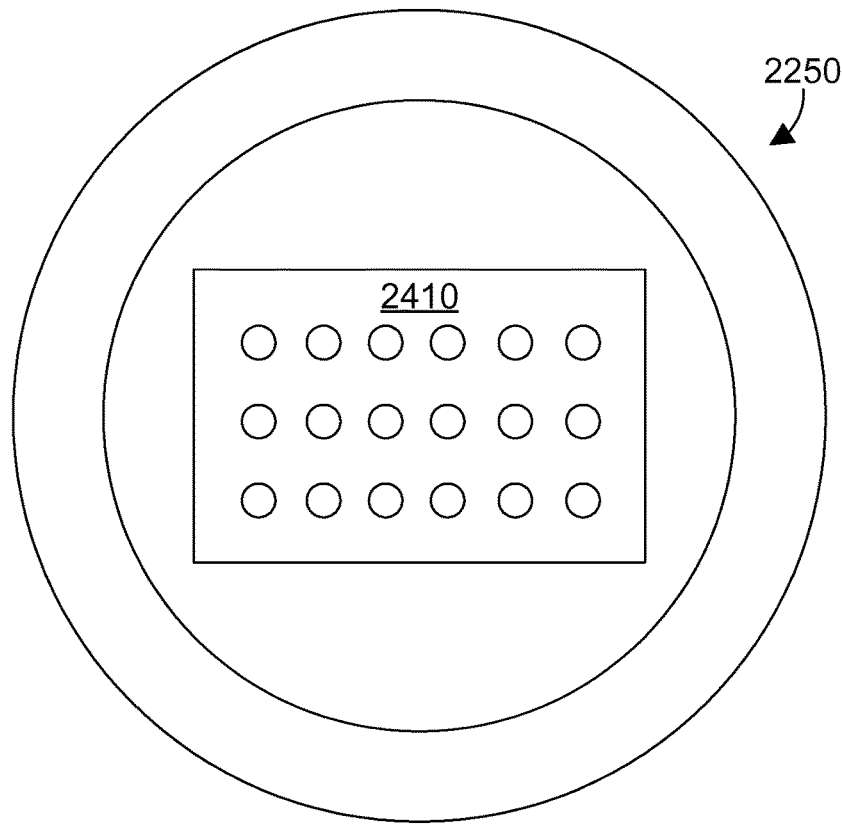
FIG. 24 is a bottom view of the removable lid shown in FIG. 23.

In one specific configuration, the cap 2250 can include a compartment for desiccant, shown at 2300 in FIG. 23. The desiccant compartment 2300 preferably includes a lid 2410 that has multiple holes, as shown in FIG. 24, that allow air in the interior of the housing to communicate with desiccant compartment 2300, thereby drying the air inside the housing. By placing the desiccant compartment 2300 within the lid 2250, the desiccant in the lid can be changed when the lid is removed to open the housing. Including desiccant in the lid assures the air within the housing is dry.

Figure 25:
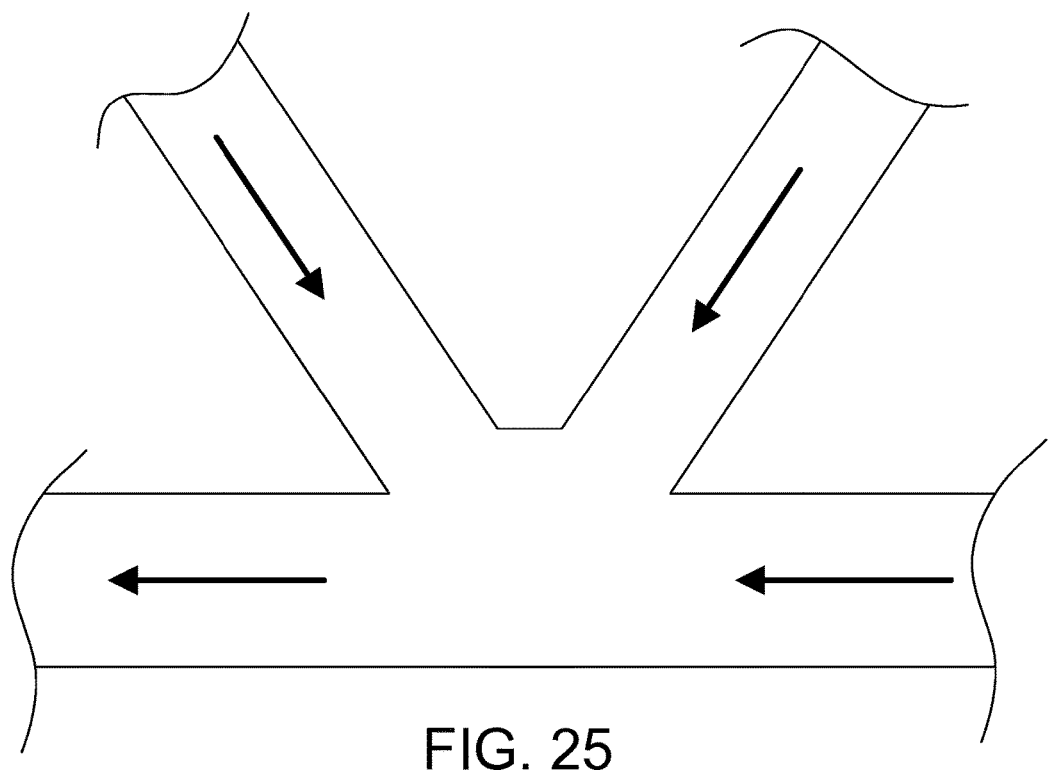
FIG. 25 is a sample wastewater junction that could be monitored using the wastewater monitoring system.
Figure 26:
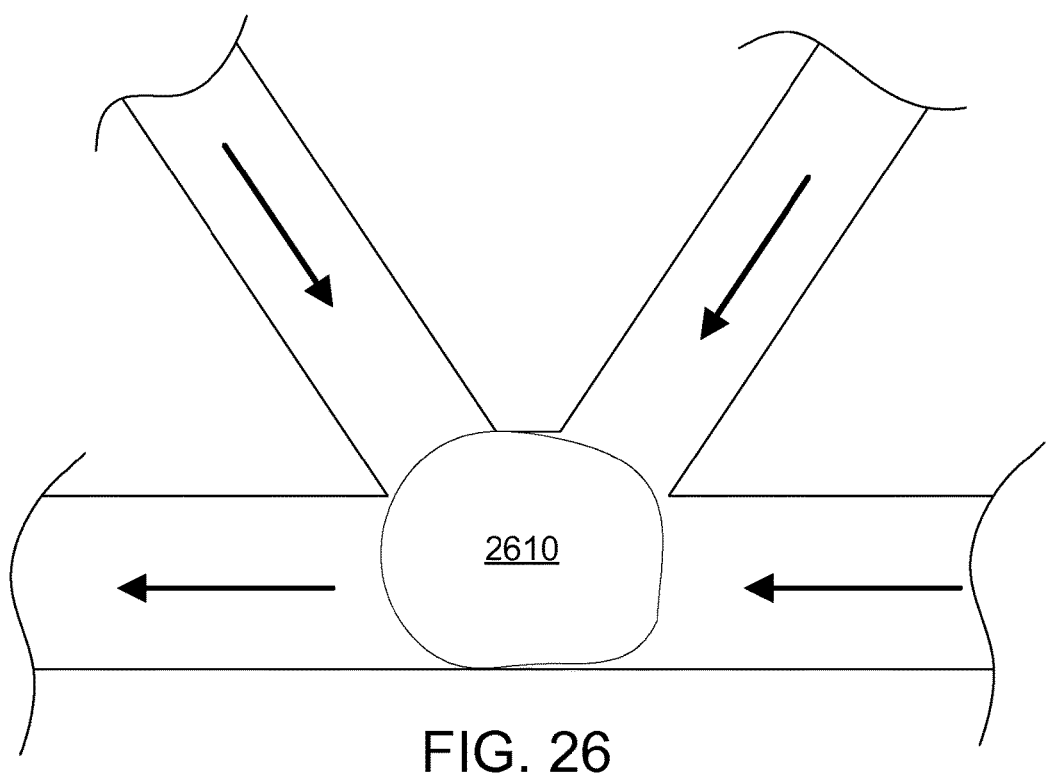
FIG. 26 shows how a user can define a first area of interest in the wastewater junction shown in FIG. 25.

One of the significant functions of the wastewater photo processing mechanism is the ability to identify video clips of interest based on user settings and based on a defined area of interest. As discussed briefly above, the system can define an area of interest based on some mathematical or statistical analysis of the photos to be processed. In the alternative, the user can manually identify an area of interest. Referring to FIG. 25, we assume a camera is pointed towards a location of interest that includes three inflows and one outflow, as shown by the arrows in FIG. 25. Each photo will have some portions that do not change over time. For example, because the water levels in the pipes are of interest, all the areas between the pipes will not have any relevance to water levels in the pipes. Thus, the areas between the pipes could be ignored in the analysis. In addition, the user could use a mouse or other pointing tool to specifically identify one or more areas of interest. FIG. 26 shows an area of interest 2610 that was defined by a user using a mouse to draw a region that defines the area of interest 2610. Because this area of interest 2610 shown in FIG. 26 is the confluence of all three inflowing pipes to the one outflowing pipe, any change in the area of interest 2610 is likely to represent a change in water level. By defining area of interest 2610 in FIG. 26, the user can focus the analysis of the wastewater photo processing mechanism on the area where changes are likely to be the most significant in relation to water level.

Figure 27:
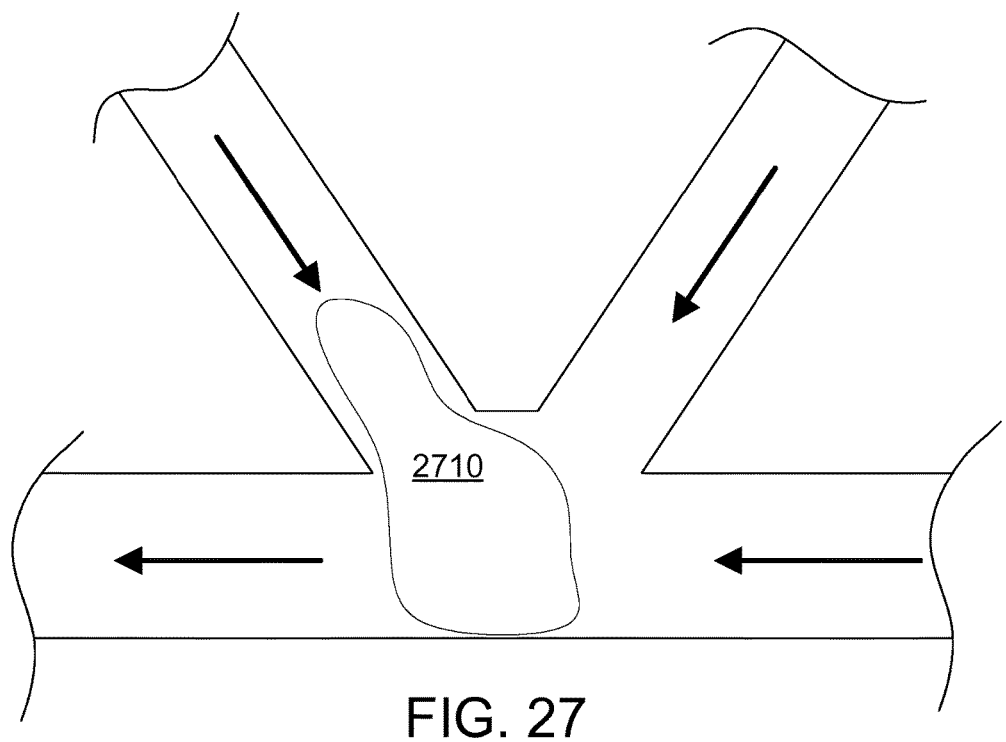
FIG. 27 shows how a user can define a second area of interest in the wastewater junction shown in FIG. 25.
Figure 28:
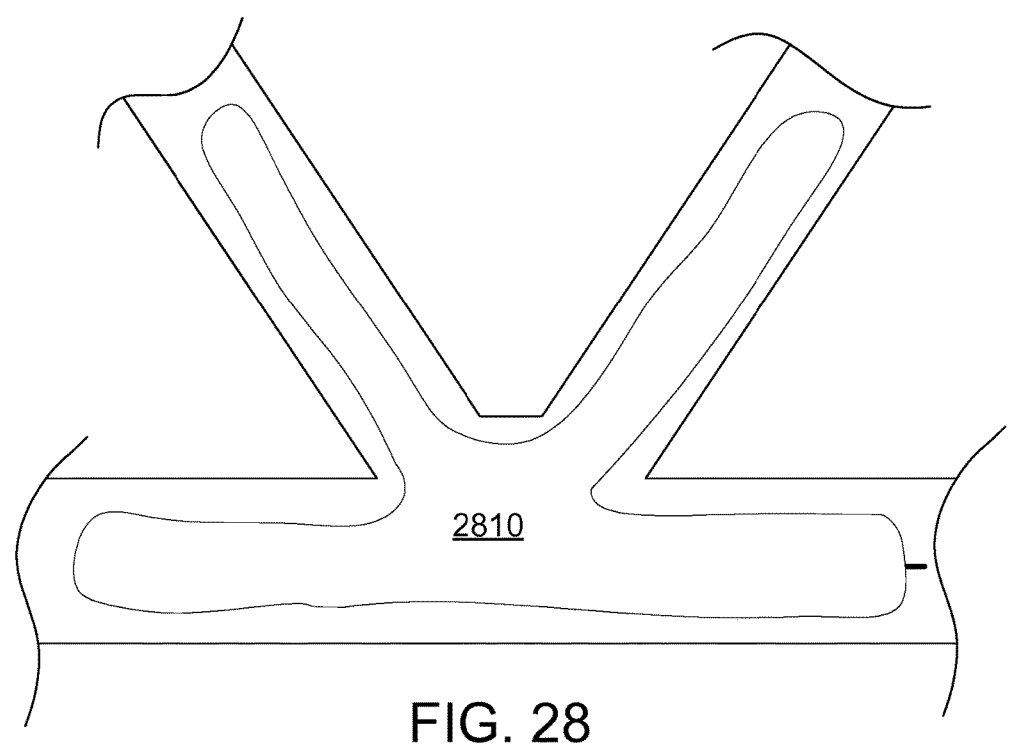
FIG. 28 shows how a user can define a third area of interest in the wastewater junction shown in FIG. 25.

FIG. 27 shows an alternative area of interest 2710 that could be defined by a user if the suspected leak is in the left-most inflow pipe, as shown in FIG. 27. Yet another way to define one or more areas of interest is by the user defining a normal flow region such as 2810 shown in FIG. 28, where everything outside the normal flow region 2810 is an area of interest. Notice that this is the opposite of what the user did in defining area of interest 2610 in FIG. 26 or 2710 in FIG. 27. Instead of outlining an area where differences in the water level are of interest, the user has defined in FIG. 28 an area where water levels are normal, thereby defining all areas outside the defined area 2810 as the areas of interest.

The wastewater monitoring system disclosed herein could be used in conjunction with other known sensors or products for monitoring wastewater systems. For example, Eastech Flow Controls makes a system called iTracker for measuring level of material in a pipe using ultrasound transducers. The iTracker system allows generating alerts when the level in a pipe gets above some specified threshold. The wastewater monitoring system disclosed could receive an alert from the iTracker system, which could cause the wastewater monitoring system to begin taking photographs, to increase the time frequency of taking photographs, etc. Teledyne Isco makes area velocity flow modules that detect velocity of material in a pipe. Such a system could also send an alert to the wastewater monitoring system disclosed herein to cause a change in how the wastewater monitoring system functions. Thus, a wastewater monitoring system as disclosed herein could be installed in proximity to an area velocity flow module, and could be programmed to only take photographs when an enable signal is received from the system that includes the area velocity flow module. Of course, other functionality is also possible, such as increasing the frequency with which the wastewater monitoring system takes photographs when a given velocity threshold is exceeded by the area velocity flow module.

The wastewater monitoring system could also include a real-time connection to a network that allows sending alerts to changing conditions. For example, a manhole might be in a street in proximity to a café that offers free Wi-Fi, allowing the wastewater monitoring system to connect via its wireless interface to the café's Wi-Fi network. In addition, various cities have initiatives to have "smart cities" with various interconnected networks throughout the city. The camera could connect to one of these networks as well. Thus, when the camera detects water on its housing, a real-time alert could be sent indicating that is water on the camera housing. When the temperature sensor detects a change in temperature in the location of interest, a real-time alert could be sent. When the pressure sensor detects a change in pressure on the camera housing, a real-time alert could be sent to signal an overflow condition. In addition, the camera could use any or all of these conditions to change its own function in addition to sending the real-time alert(s). An operator could receive a real-time alert, such as an e-mail or a text message, which would then enable the operator to better understand the conditions where the wastewater monitoring system is installed. The video stream generated from the photographs could also be tagged to indicate to the user when the real-time alert occurred. This could be done by the camera itself, or by the wastewater photo processing mechanism using timestamps to correlate the real-time alerts to the corresponding photograph or photographs in the video stream.

A wastewater monitoring system uses a camera in a fixed location in a wastewater pipe that takes a still photograph of a location of interest at defined intervals, such as five minutes. The photographs are retrieved from the camera, and are then analyzed on a computer system that aggregates the still photographs into a video stream, allows a user to define an area of interest on one of the still photographs, then uses suitable algorithms or heuristics to detect changes between the photographs in the video stream. Video clips of interest are then generated using the detected changes, and are identified to a user so the user can review the video clips of interest to determine flows in the wastewater pipe that was monitored.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A method for monitoring level of material in a pipe comprising:
    mounting a digital camera in a waterproof housing in a fixed location with a lens facing a location of interest in the pipe;
    setting a timer interval for the camera to take a photograph;
    the camera taking and storing a photograph of the location of interest during each timer interval;
    retrieving the stored photographs from the camera;
    aggregating the photographs into a video stream; and
    detecting changes in the photographs that indicate changes in the level of the material in the pipe, wherein detecting changes in the photographs comprises performing at least one mathematical analysis of differences in the photographs, wherein the at least one mathematical analysis of differences in the photographs comprises computing an average pixel value over a predefined number of photographs and determining when a plurality of pixels in a photograph exceed the computed average pixel value by some defined threshold.

2. A method for monitoring level of material in a pipe comprising:
    mounting a digital camera in a waterproof housing in a fixed location with a lens facing a location of interest in the pipe;
    setting a timer interval for the camera to take a photograph;
    the camera taking and storing a photograph of the location of interest during each timer interval;
    retrieving the stored photographs from the camera by transferring the stored photographs from the camera to a portable device;
    using first software to aggregate the photographs into a video stream;
    using second software to electronically process the video stream to detect changes in the photographs that indicate changes in the level of the material in the pipe by performing at least one mathematical analysis of differences in the photographs, wherein the at least one mathematical analysis of differences in the photographs comprises computing an average pixel value over a predefined number of photographs and determining when a plurality of pixels in a photograph exceed the computed average pixel value by some defined threshold;
    using the second software to generate at least one video clip of interest from the detected changes in the photographs; and
    identifying to a user the at least one video clip of interest.

3. The method of claim 2 further comprising the user defining user settings that determine how the at least one video clip of interest is generated.

4. The method of claim 2 further comprising the user using a software tool in the second software to define an area of interest on one of the photographs that determines where the changes in the photographs are detected.

5. The method of claim 4 wherein the user defines the area of interest by defining a region on one of the photographs in which to look for the changes.

6. The method of claim 4 wherein the user defines the area of interest by defining a region of normal flow in the pipe, wherein the area of interest comprises at least one area outside the defined region of normal flow in the pipe.

7. A method for monitoring level of material in a pipe comprising:
    mounting a digital camera in a waterproof housing in a fixed location with a lens facing a location of interest in the pipe;
    setting a timer interval for the camera to take a photograph;
    the camera taking and storing a photograph of the location of interest during each timer interval;
    retrieving the stored photographs from the camera by transferring the stored photographs from the camera to a portable device;
    aggregating the photographs into a video stream;
    detecting changes in the photographs that indicate changes in the level of the material in the pipe, wherein detecting changes in the photographs comprises performing at least one mathematical analysis of differences in the photographs that comprises computing an average pixel value over a predefined number of photographs and determining when a plurality of pixels in a photograph exceed the computed average pixel value by some defined threshold;
    generating at least one video clip of interest from the detected changes in the photographs; and
    identifying to a user the at least one video clip of interest.

8. A method for monitoring level of material in a pipe comprising:
    mounting a digital camera in a waterproof housing in a fixed location with a lens facing a location of interest in the pipe;
    setting a timer interval for the camera to take a photograph;
    the camera taking and storing a photograph of the location of interest during each timer interval;
    retrieving the stored photographs from the camera by transferring the stored photographs from the camera to a portable device;
    aggregating the photographs into a video stream;
    detecting changes in the photographs that indicate changes in the level of the material in the pipe, wherein a user uses a software tool to define an area of interest on one of the photographs that determines where the changes in the photographs are detected, wherein the user defines the area of interest by performing one of:
        defining a region on one of the photographs in which to look for the changes; and defining a region of normal flow, wherein the area of interest comprises at least one area outside the defined region of normal flow;

wherein detecting changes in the photographs comprises performing at least one mathematical analysis of differences in the photographs that comprises computing an average pixel value over a predefined number of photographs and determining when a plurality of pixels in a photograph exceed the computed average pixel value by some defined threshold; and the user defining user settings that determine how the at least one video clip of interest is generated;

generating at least one video clip of interest from the detected changes in the photographs;

identifying to the user the at least one video clip of interest.

9. A method for determining flow of wastewater in a wastewater pipe over a defined time period comprising:

retrieving from a digital camera positioned in a fixed location with a lens facing a location of interest in the wastewater pipe a plurality of photographs of the location of interest in the wastewater pipe during the defined time period;

aggregating the plurality of photographs into a video stream of the location of interest in the wastewater pipe;

a user using a software tool to define an area of normal wastewater flow in the wastewater pipe on one of the plurality of photographs;

electronically processing the video stream to detect changes in the plurality of photographs that indicate wastewater flow outside the area of normal wastewater flow defined by the user based on a mathematical analysis that determines a number of pixels in a selected one of the plurality of photographs outside the area of normal wastewater flow are different than corresponding pixels in at least one photograph preceding the selected one photograph;

generating at least one video clip of wastewater flow outside the area of normal wastewater flow from the detected changes in the plurality of photographs; and identifying to a user the at least one video clip of wastewater flow outside the area of normal wastewater flow.

10. The method of claim 9 wherein detecting changes in the photographs comprises performing at least one mathematical analysis of differences in the photographs that comprises computing an average pixel value over a predefined number of photographs and determining when a plurality of pixels in a photograph exceed the computed average pixel value by some defined threshold.

* * * * *